Figure 1:
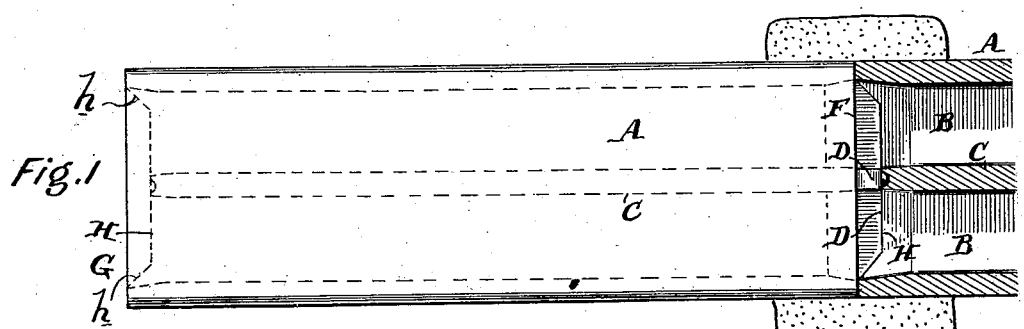

No. 703,447. Patented July 1, 1902.
W. L. McGOWAN.
CONDUIT.
(Application filed Feb. 8, 1902.)

(No Model.)

Attest
P. M. Kelly
John MacMaster

Inventor
Wm. L. McGowan
By his atty

UNITED STATES PATENT OFFICE.

WILLIAM L. McGOWAN, OF PHILADELPHIA, PENNSYLVANIA.

CONDUIT.

SPECIFICATION forming part of Letters Patent No. 703,447, dated July 1, 1902.

Application filed February 8, 1902. Serial No. 93,121. (No model.)

*To all whom it may concern:*

Be it known that I, WILLIAM L. MCGOWAN, of the city and county of Philadelphia and State of Pennsylvania, have invented an Improvement in Conduits, of which the following is a specification.

My invention relates to conduits; and it consists of the improvements which are fully set forth in the following specification and are shown in the accompanying drawings.

More particularly, my invention relates to that class of conduits which are formed of sections divided internally by longitudinal partitions into a series of compartments intended for electric cables, the sections being butted together and united to form a continuous conduit. Usually the sections have been held in alinement by dowel-pins and have been united by cement joints. Much difficulty has been experienced in conduits of this character in properly forming a tight and strong joint between the sections, and if for any cause it is necessary to undermine the conduit all other support is removed and the weight of the sections, with their load, falls wholly upon the concrete or cement bond and the dowel-pins, and rupture frequently occurs. The use of dowel-pins is unsatisfactory, and it frequently happens that owing to the inequality in the shrinkage of different sections during the burning of the terra-cotta, of which they are formed, the pin-holes in the ends of adjacent sections are not in perfect alinement, and consequently the dowel-pins cannot be used and the cement alone must be relied upon for the union.

It is the object of my invention to provide the sections with a joint which will insure a tight and strong union capable of withstanding all ordinary transverse strains at the joints and without the use of dowel-pins. To accomplish this object, I project the interior partition-walls at one end of the section beyond the outer body-walls, so as to form a central projection composed of the internal partition-walls, and I provide the adjacent end of the next section with a complementary socket formed by abbreviating or shortening the internal partition-walls to an extent corresponding with their extension in the other section. In practice each section will be ordinarily provided with the extension of the partition-walls at one end and the complementary abbreviation or shortening at the other. When the sections are placed together to form a continuous conduit, the ends of the outer body are butted together, and the projection formed by the extension of the inner partition-walls at one end of one section fits in the complementary recess formed by the abbreviation of the partition-walls in the end of the adjacent section, thus permitting a tight joint to be formed by which transverse strains at the joints are transmitted to the abutting sections.

Figure 3:
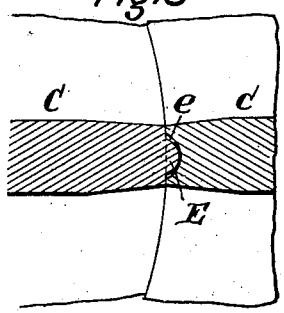
Figure 2:
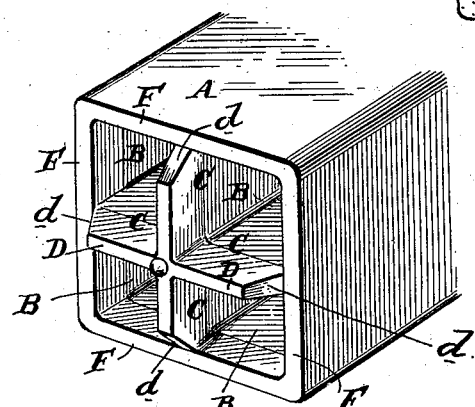
Figure 4:
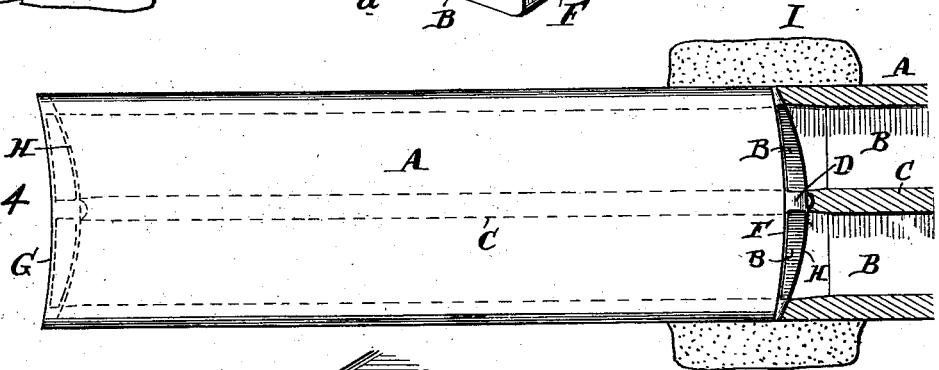

In the drawings, Figure 1 is a view of a portion of a conduit formed of sections embodying my invention, one section being shown in plan and the other in longitudinal horizontal section. Fig. 2 is a perspective view of the end of one of the sections, illustrating one form. Fig. 3 is a longitudinal section, enlarged, showing the joint formed by two sections. Fig. 4 is a view similar to Fig. 1, but illustrating the sections with curved or spherical ends; and Fig. 5 is a perspective view of the end of one of the sections of the form shown in Fig. 4.

A is the tubular body, provided with longitudinal walls or partitions C, dividing the section internally into a series of longitudinal cable-compartments B. These internal walls or partitions C are not coextensive with the outer walls A of the section, but are projected or extended at one end in extensions or projecting portions D beyond the end F of the outer body, while at the other end they do not extend up to the end G of the outer body, but terminate, as at H, and thus form a recess or socket complementary to the projection or extension D at the other end. In the construction shown in Figs. 1 and 2 this extension of the four partitions C forms a cross-shaped projection, the ends of the arms of which are perfectly reduced or tapered, as at *d*, and the ends of the walls C at the other end are correspondingly tapered, as at *h*. The particular shape of the projection of the partitions and of the complementary recess will, however, vary with changes in the arrangement of the dividing-partitions. In the construction shown in Figs. 3, 4, and 5 the projecting ends D are curved on their faces, so as to form a concave or spherical projection, and the ends of the partitions at the other end are formed with a complementary concave face.

In placing the sections together to form a continuous conduit the projection D, formed by the extended partition-walls of one section, is fitted into the complementary recess H, formed by the abbreviation of the walls of the next section. The sections are fitted together to form a tight joint, with the ends F G of the outer bodies butted together, which is then enveloped in the cement or concrete I in the usual manner. A very strong union is thus formed, which is capable of withstanding heavy lateral pressure without rupture. As the ends fit within one another there will be no possibility of any gap or open space between the ends, even if the ends of the outer body are slightly uneven. If desired, the projection D, formed by the extension of the partition-walls, may be formed with a knob or projection E, adapted to enter a recess or socket $e$ in the socketed ends of the walls of the other section. This serves to center the sections, and in the construction shown in Figs. 3, 4, and 5 it permits of a lateral or angular adjustment of one section with reference to the other without shifting the central point of union. I do not, however, claim the use of this button and socket in connection with the spherical projecting end and recess, as that forms part of the subject-matter of my application No. 79,676, filed October 28, 1901.

Figure 5:
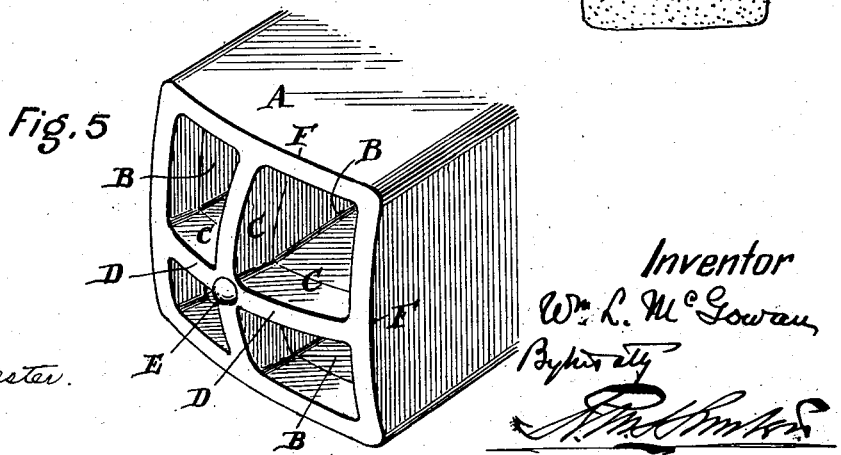

It is apparent that when the extremities of the sides of the ends of the outer body A are made curved or irregular, as at F and G in Figs. 4 and 5, the ends F are provided with projections which will engage with the complementary recesses in the extremities of the sides of the ends G and lock the sections against lateral displacement, irrespective of the interlocking through the projection D and recess H of the partition-walls. This means of interlocking may be used in some cases without the projection and recessing of the partition-walls or in cases where the partition-walls are not employed. The details of construction shown may be varied without departing from the invention.

What I claim as new, and desire to secure by Letters Patent, is as follows:

1. A conduit-section consisting of a tubular outer body having longitudinal partitions or walls dividing it internally into a series of longitudinal ducts, said dividing or partition walls at one end being extended beyond the ends of the walls of the outer body to form a projection composed of said partitions, and at the other end being abbreviated to terminate within the end walls of the outer body to form a recess or socket complementary to the projection of the partition-walls at the other end.

2. A conduit-section consisting of a tubular outer body having longitudinal partitions or walls dividing it internally into a series of longitudinal ducts, said dividing or partition walls at one end being extended beyond the ends of the walls of the outer body to form a projection composed of said partitions, and at the other end being abbreviated to terminate within the end walls of the outer body to form a recess or socket complementary to the projection of the partition-walls at the other end, the faces of said projecting and abbreviated ends of the partition-walls being tapered or inclined.

3. A conduit-section consisting of a tubular outer body having longitudinal partitions or walls dividing it internally into a series of longitudinal ducts, said partition-walls at one end being extended beyond the ends of the walls of the outer body to form a projection composed of said partitions.

4. A conduit-section consisting of a tubular outer body having longitudinal partitions or walls dividing it internally into a series of longitudinal ducts, said partition-walls at one end being abbreviated or terminated within the bounding edges of the outer body and at a distance therefrom, to form a recess or socket between the ends of the partitions and the end of the outer body.

5. A conduit having two hollow sections of polygonal cross-section provided with dividing-walls of which the extremities of the dividing-walls of the end of one section are provided with projections beyond the end of the section and the extremities of the dividing-walls of the end of the other section are provided with recessed portions within the end of the section and complementary to the projections on the end of the first section.

In testimony of which invention I have hereunto set my hand.

WM. L. McGOWAN.

Witnesses:
ELIAS NUSBAUM,
ERNEST HOWARD HUNTER.